Dec. 24, 1929.   C. R. LITTLE   1,740,740
COVER FOR JOINTS
Filed Nov. 4, 1926
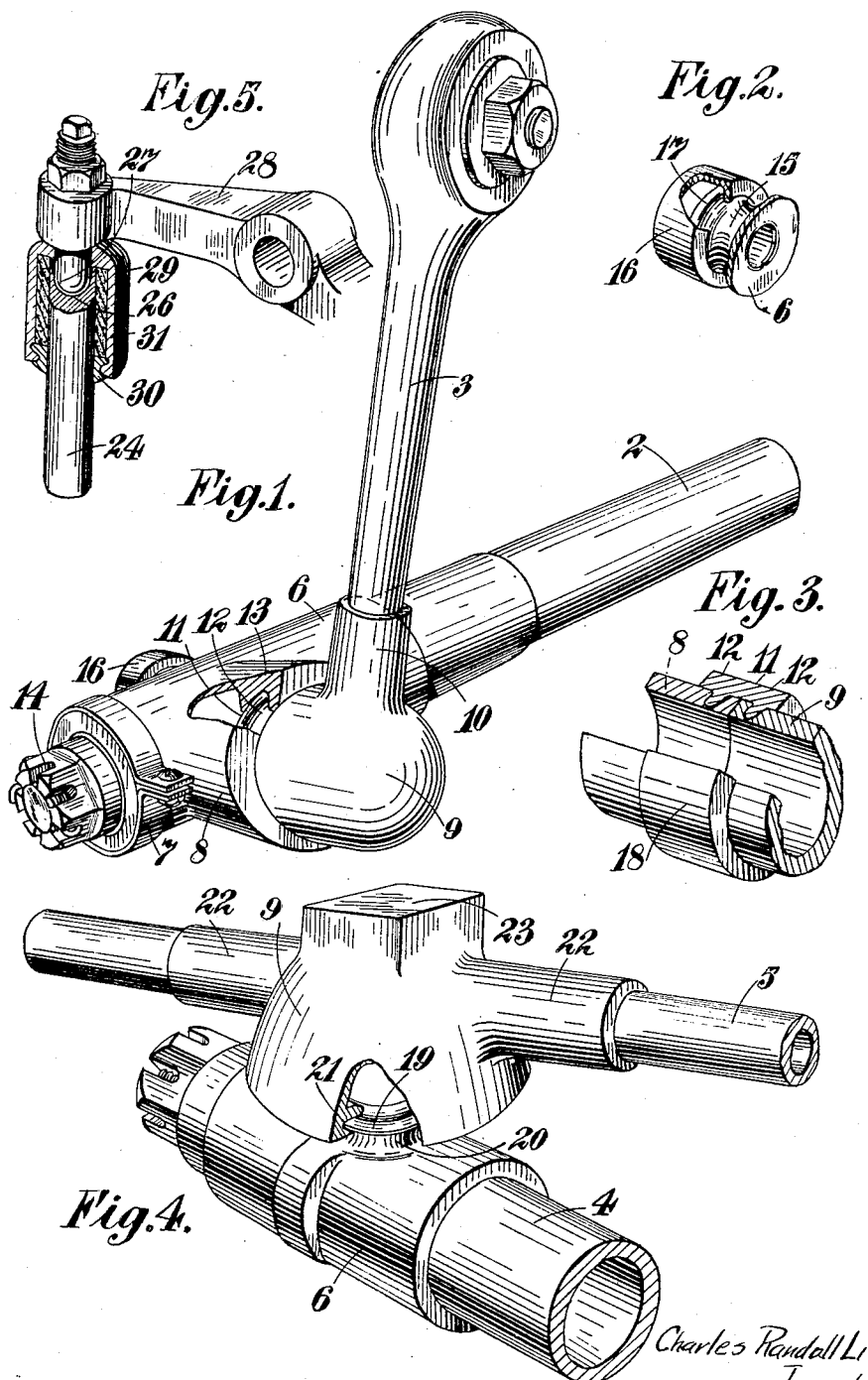
Charles Randall Little
Inventor
his Attorney Patented Dec. 24, 1929

1,740,740

UNITED STATES PATENT OFFICE

CHARLES RANDALL LITTLE, OF COVENTRY, ENGLAND

COVER FOR JOINTS

Application filed November 4, 1926, Serial No. 146,161, and in Great Britain May 18, 1926.

This invention relates to joint covers, of the kind employed to exclude foreign matter and to retain lubricant around the pivotal joints of rods and levers or other linkwork, and its object is to provide a construction which will be easy to assemble or dismantle, flexible in use, and relatively cheap to construct.

In my prior Patent No. 1,591,390, I have described a form of joint cover which can be successfully employed where the amount of movement is small. In the present invention a cover is provided which can be used where the relative movement between the pivoted parts is very considerable. It permits, if necessary, of complete rotation between the parts in one plane and limited angular movement between them in other planes.

According to this invention, the cover is flexible and is formed in two parts connected to one another by a resilient fluid-tight running joint.

In the accompanying drawings,

Figure 1 is a perspective view showing the attachment of a drag link 2 to the drop arm 3 of the steering gear of a motor vehicle, with the joint between these enclosed in a cover constructed in accordance with this invention.

Figure 2 is a perspective view of part of the same, partially broken away.

Figure 3 is a perspective view, chiefly in section, showing part of a modified joint.

Figure 4 is a perspective view illustrating a modified form of cover used in a different kind of joint between two rods 4 and 5, which might form part of the steering gear of a motor vehicle.

Figure 5 illustrates a modification applicable to the joint between a rod and a lever, such as a valve rocker, where it is desired that the rod should be free to rotate.

Like numerals indicate like parts throughout the drawings.

In the constructions shown in Figures 1 and 2, one part of the cover is a cylindrical sleeve 6 adapted to be clipped by the clip 7 on to the drag link 2 and having a short lateral branch 8, the bore of which may be considerably greater than that of the sleeve part 6.

The other part 9 of the cover is of bowl or cap shape provided with a branch in the form of a sleeve 10. This sleeve 10 is adapted to be clipped or sprung around the drop arm 3 which carries the usual ball joint, and the bowl is large enough to receive partly or wholly the ball joint and to constitute a receptacle for lubricant. The material at 12 around the mouth of the bowl is reduced and adapted to enter spigotally the lateral branch 8 on the sleeve 6, and it is provided on the spigotal portion with a radial flange or collar 11 adapted to engage a corresponding circumferential groove 13 formed within and around the lateral branch 8. Thus, by a slight stretching of the one and compression of the other, the two parts 6 and 9 can be engaged with one another, the radial flange 11 engaging the groove 13 and holding the two parts resiliently yet firmly together, forming a running joint which will permit considerable angular movement between the arm 3 and link 2.

The parts 6 and 9 are mounted on the respective joint elements so that their connection with one another will be coaxial or substantially so with the joint enclosed, and thus, however the latter may move, the sleeve can accommodate itself without the two parts becoming disconnected. Furthermore, as the parts are flexible the complete cover can yield resiliently to tilting as well as angular movements of the linkwork joint.

If desired, the outer end of the sleeve 6 may be provided with a detachable cap or stopper (not shown) which covers the end of the link 2 and the nut 14 and also gives access to the latter.

Either part may be provided with a filler neck 15 for introduction of lubricant, and this latter may be provided with a flexible cap 16 or stopper engaging an external collar 17 or an internal groove in the filler neck, see Figure 2.

As an alternative to the method of connecting the two parts as above, they may each (as is shown in Figure 3) be formed at their junction with radial grooves 12 engaged by co-acting parts on a surrounding band 18 or collar of flexible or other material.

In the arrangement shown in Figure 4, the rod 4 is pivotally attached to an intermediate point in the link 5. In such a case the rod 4 carries a sleeve 6 similar to that shown in Figure 1, and this is connected by means of a flange 19 upon the neck 20 with a groove 21 on the interior of the other cover part 9. This takes the form of a bowl or cap with lateral branches 22 which may be clipped or sprung on to the rod 5. This part of the cover may include a recess at 23 to enclose a nut, or some other part, of the linkwork joint. Either or both parts 6 and 9 may carry means for the introduction of lubricant.

In Figure 5 there is a rod 24 terminating with a cup 26 which abuts against a ball-ended screw 27 carried by a lever 28, which may be the valve rocker of an internal combustion engine. This is a conventional arrangement wherein it is desirable that the abutting faces between the part 27 and the cup 26 should be enclosed. For this purpose one part 29 of the joint cover consists of a sleeve with a neck which contracts on to the ball-ended portion 27 and is spaced away from the rod 24. Upon the rod is sprung a collar 30 and there is a groove and tongue connection between the collar 30 and sleeve 29 which forms a running joint of the type hitherto described. Lubricant is inserted in the space 31 between the sleeve and the rod, which serves not only to lubricate the running joint but also the surface 26. Thus the rod can twist in relation to the lever 28.

A joint cover as above described is cheaper and more flexible than leather, is very easy to assemble or dismantle, and is adapted to permit unlimited angular movement of the elements of the joint. Thus, for example, it could be used to enclose the joint of a crank and connecting rod. The lubricant employed may be such as is non-injurious to rubber, and in practice it serves to lubricate the joint between the two parts of the cover so that the bearing surfaces thereon are able to withstand prolonged usage without appreciable wear. It will also be noticed that the collar and groove connection is one adapted to prevent leakage of lubricant at the junction of the sleeves.

Throughout the specifications and claims I have used the term "running joint" by which I mean a joint in which one surface rotates or moves in relation to the other.

What I claim as my invention and desire to secure by Letters Patent of the United States is:—

1. In a flexible cover for a pivotal connection in combination with two link members of a joint, a cover piece enclosing one link member provided with an annular groove, a cover piece enclosing the other link member provided with an annular flange interfitting with the groove of the first piece to form a fluid tight and running joint.

2. In a flexible cover for a pivotal connection in combination with two link members of a joint, a rubber sleeve enclosing one link member provided with a lateral branch having an annular groove, a rubber cap enclosing the other link member provided with an annular flange interfitting with the groove of the sleeve to form a fluid tight and running joint.

3. In a flexible cover for hinge joint for rods, a rod provided with an external annular groove, a rod operatively connected to the first mentioned rod, a bulb having flexible walls enclosing one side of said joint with clearance from it thereby forming a reservoir for lubricant, said bulb having one end provided with an annular rib engaging the before mentioned annular groove on said rod and thereby forming a running connection with said rod and an opening whose wall is resilient and adapted to resiliently grip the other rod.

In testimony whereof I have signed my name to this specification.

CHARLES RANDALL LITTLE.